Sept. 18, 1962  W. R. MILLER ETAL  3,054,190
COMPOUND ANGLE GAGE
Filed Nov. 2, 1959  3 Sheets-Sheet 1

INVENTORS,
WILLIAM R. MILLER
BY ANTHONY R. KONECNY
Woodling + Krost
Att'ys

Sept. 18, 1962  W. R. MILLER ETAL  3,054,190
COMPOUND ANGLE GAGE
Filed Nov. 2, 1959  3 Sheets-Sheet 2
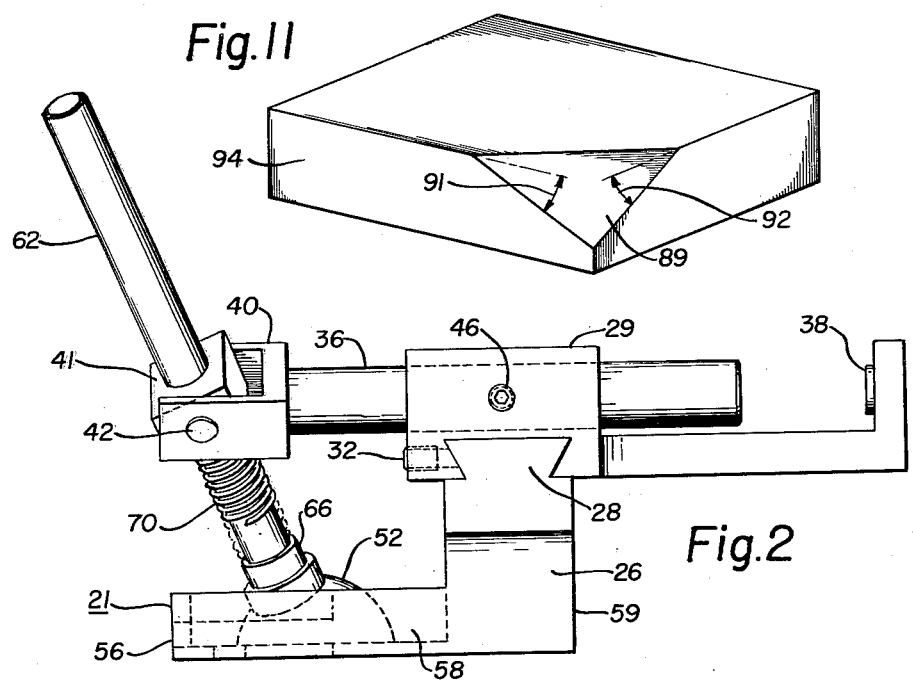
Fig.11
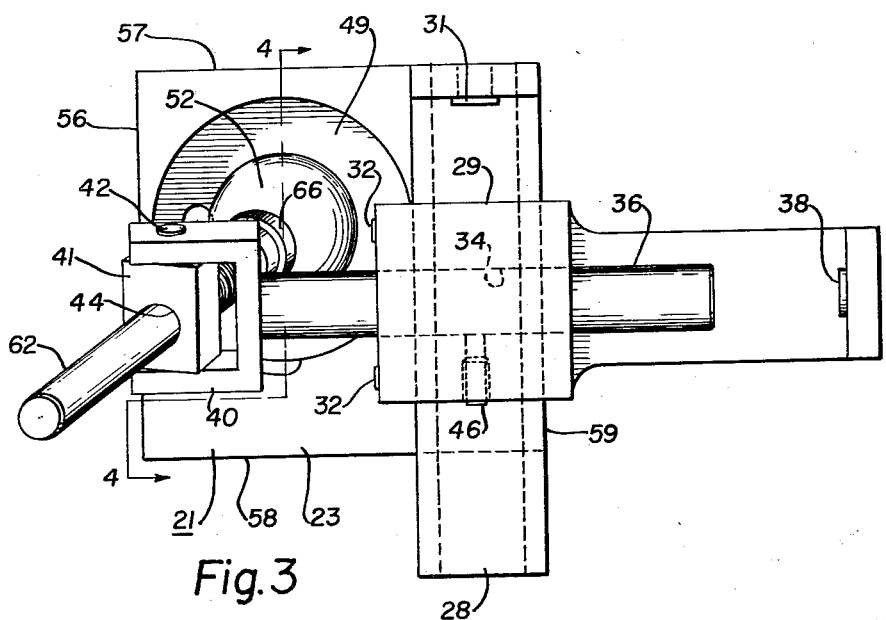
Fig.2
Fig.3
INVENTORS.
WILLIAM R. MILLER
BY ANTHONY R. KONECNY

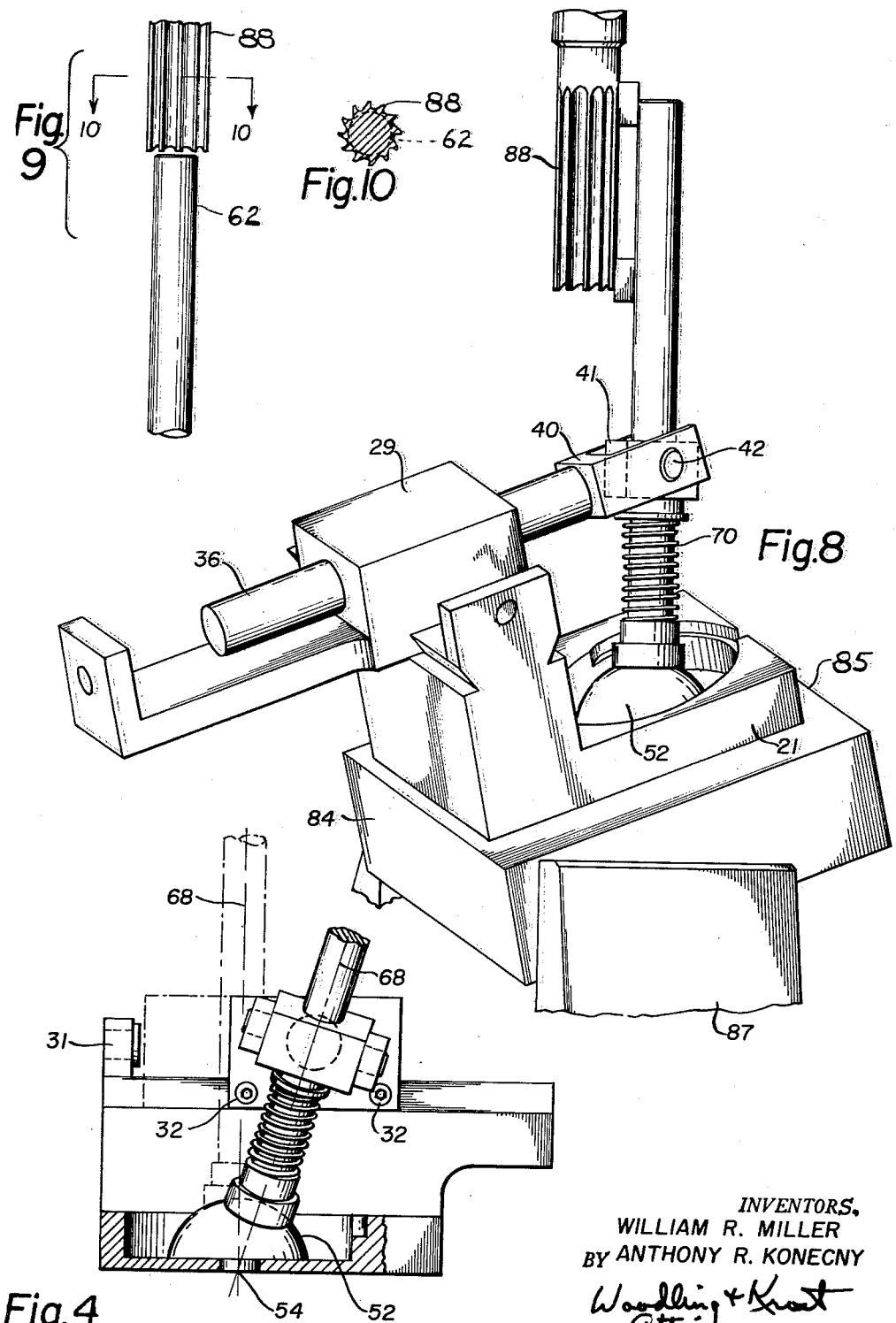

United States Patent Office 3,054,190
Patented Sept. 18, 1962

3,054,190
COMPOUND ANGLE GAGE
William R. Miller, State College, Pa., and Anthony R. Konecny, Berkeley, Mo., assignors of one-third to Charles R. Rust, Cleveland, Ohio
Filed Nov. 2, 1959, Ser. No. 850,415
7 Claims. (Cl. 33—185)

The invention relates in general to gages and more particularly to gages for determining and locating compound angles and other angles.

In the prior art the problem of locating compound angles when it was desired to produce a hole or a surface at such an angle, was met in several ways all of which were time consuming and in many instances inaccurate. In the normal situation a compound angle hole in a workpiece is indicated in the front elevation of the working drawings as being at a given angle A from the vertical (for example) and in the side elevation as being at a given angle B from the vertical (for example). In order to shift the workpiece into the proper position relative to a tool in the spindle of a machine (or vice versa) it is not possible to shift the workpiece through an angle to correspond to angle A and through an angle to correspond to angle B. The reason for this is because after shifting the workpiece through angle A it is no longer located the angle B given in the side elevational view but rather an angle C which is not known. As a result this angle C must be calculated. This can be done with the proper mathematical background; however, it is still time consuming as well as being subject to the human element.

Another method of locating compound angle holes and surfaces has been to take a piece of stock and more or less experiment with the same until the proper angle has been determined. After this has been done the workpiece is substituted for the piece of stock and the hole or surface is then machined. Other methods are of course resorted to in the prior art with varying degrees of success.

It is therefore an object of the present invention to provide a device which will determine compound angles directly from the elevational views of the working drawings.

Another object of the invention is to provide a gage for determining compound angles and for example, in the case of holes to position or locate the spindle of the machine on the centerline of the hole so as to position the same as well as determine the correct angle.

Another object of the invention is to provide a gage which determines angles other than compound angles.

Another object of the invention is to provide a gage which does away with the necessity of mathematical calculations in determining and setting up compound angles.

Another object of the invention is to provide a compound angle gage which is quickly and easily used to set up a workpiece whereby compound angle holes and surfaces can be produced thereon.

Another object of the invention is to provide a compound angle gage which gives a visual representation of the angle.

Other objects and a fuller understanding of this invention may be had by referring to the following description and claims, taken in conjunction with the accompanying drawings, in which:

FIGURE 2 is a view of the gage taken from the right end thereof;

FIGURE 3 is a plan view of the gage;

FIGURE 4 is a fragmentary view taken generally along the line 4—4 of FIGURE 3;

Figure 5:
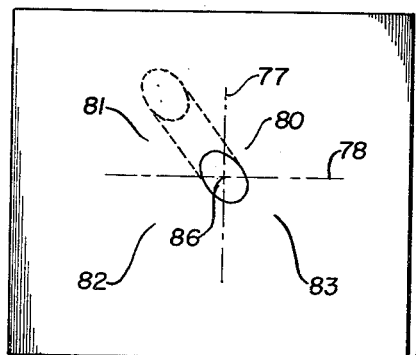
Figure 7:
Figure 6:
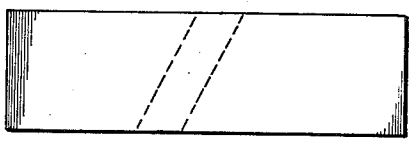

FIGURES 5, 6, and 7 are respectively top, front, and side elevational views similar to those shown in engineering drawings and illustrating a compound angle hole in a workpiece;

FIGURE 8 is a perspective view of the gage in position on the workpiece shown in FIGURES 5, 6, and 7 and with the indicating rod aligned parallel with a tool which is to be used to produce the compound angle hole;

FIGURE 9 is a fragmentary view showing the tool of FIGURE 8 aligned concentrically with the indicating rod;

FIGURE 10 is a view taken generally along the line 10—10 of FIGURE 9; and

FIGURE 11 is an isometric view of a workpiece showing a corner removed.

The compound angle gage, illustrated herein, includes in combination a base 21 having upper and lower surfaces 23 and 24, respectively, a vertical member 26 is secured to the base at the rear thereof and extends upwardly therefrom. The upper surface of the vertical member is machined into the shape of a dovetail 28 and mounted upon the dovetail 28 is a dovetail slide 29. The dovetail slide is adapted to move on the dovetail 28 between an abutment 31 and the right end of the dovetail 28. The dovetail slide may be locked in position by use of two locking screws 32 which are adapted to engage the dovetail 28.

The dovetail slide 29 is provided with an opening 34 which is in a direction normal to the direction which the dovetail slide is adapted to move on the dovetail. A second slide 36 in the nature of a cylindrical rod is fitted in the opening 34 and is adapted to be moved in a direction normal to the movement of the first or dovetail slide 29. The movement of the second slide 36 in one direction is limited by a second abutment 38. The end of the second slide 36 opposite the abutment 38 is provided with a yoke 40 and the yoke carries a pivot block 41 secured thereto by pivot members 42. The pivot block 41 is also provided with an opening 44 for a purpose which will be described hereinafter. It will be noted that the movement of the dovetail slide 29 and the second slide 36 are in directions parallel with the lower surface 24 of the base 21. The second slide 36 is adapted to be secured in a fixed position relative to the dovetail slide 29 by means of a screw 46.

The base 21 has been recessed as at 49 and pivot means are mounted therein. The pivot means includes a member 51 which is substantially a hemisphere. The member 51 might also be said to include a surface 52 which is at least a portion of a spherical surface. It will be noted especially from FIGURES 1 and 4 that the center of radius 54 of the spherical surface 52 coincides with the lower surface 24 of the base 21. The center of radius 54 is also located a known distance B from the front side 56 of the base and a known distance A from the left side 57 of the base. The right and rear sides of the base of the gage have been indicated by the reference numerals 58, and 59, respectively.

An indicating rod 62 is provided and has first and second end portions 63 and 64, respectively. The first end portion 63 of the indicating rod includes a collar member 66 which is in engagement with and slides on the spherical surface 52. The second end portion of the indicating rod extends through the opening 44 in the pivot block 41. It will thus be seen that movement of the dovetail slide 29 and/or the second slide 36 will cause movement of the second end portion of the indicating rod and a change in position of the first end portion of the indicating rod on the spherical surface.

An important feature of this construction, however, is that regardless of the position of the indicating rod on the spherical surface, the axis 68 of the indicating rod passes through the center of radius 54 of the spherical surface 52. A spring 70 extends between the collar member 66 and the pivot block 41 and serves to keep the first end portion of the indicating rod in engagement with the spherical surface 52. The base of the gage has been additionally recessed as at 72 to provide a clearance for the first end portion of the indicating rod in extended positions thereof.

It will therefore be readily appreciated that since the vertical height from the lower surface 24 of the base 21 to the axis of the second slide 36 is known and since the distance the axis of the second slide is moved from the abutment 31 and abutment 38 can be readily predetermined by use of gage blocks, the angle of the indicating rod in two mutually perpendicular planes can be easily calculated. As a result, a chart has been prepared for use with the gage wherein angular positions of the indicating rod can be calibrated with respect to the number of inches of gage blocks 74 and 75 required.

Figure 1:
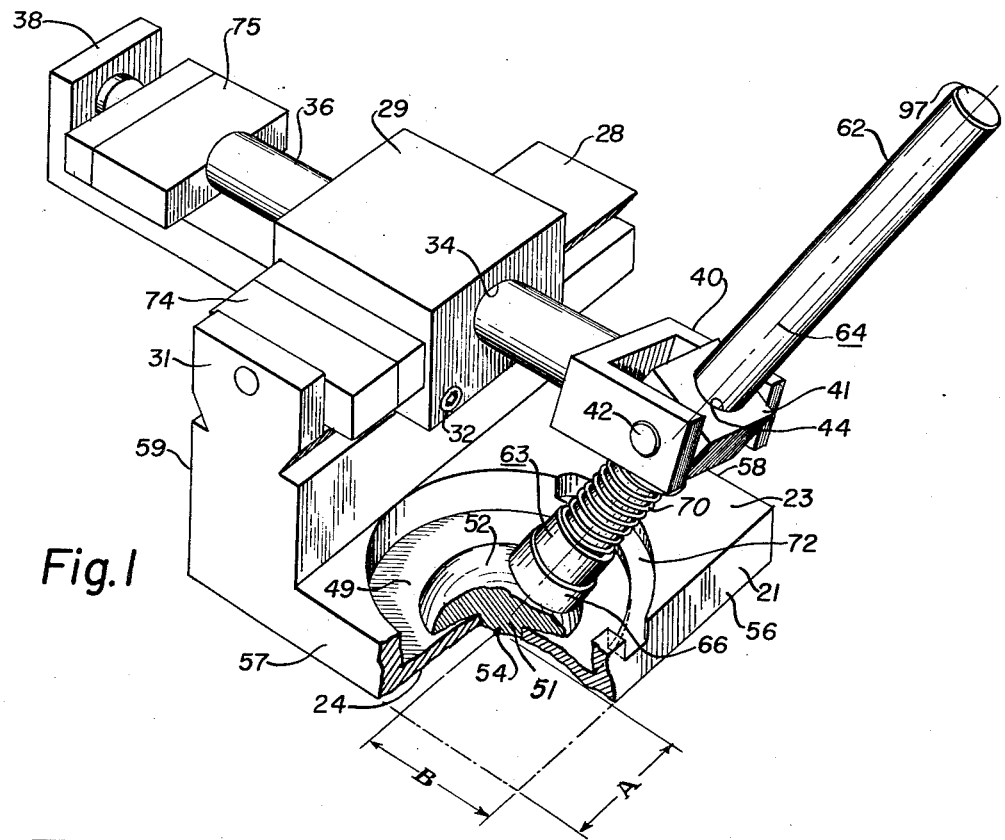
FIGURE 1 is a perspective view of the gage of the present invention with a portion thereof broken away for a better understanding of the same.

FIGURES 5, 6 and 7 are respectively the top, front, and side elevational views of a workpiece with a compound angle hole therein. The dot-dash lines 77 and 78 serve to divide the opening of the hole and the top surface into quadrants 1, 2, 3, and 4, respectively numbered 80, 81, 82, and 83. It will thus be seen from FIGURE 5 that the bottom of any hole drilled on a compound angle will extend into one of the four quadrants. The hole shown in FIGURES 5, 6, and 7 extends into quadrant number 2 which has been indicated by the reference numeral 81. In order to utilize the gage shown in FIGURE 1 to properly position the workpiece relative to the spindle of a machine so that the proper compound angle can be produced, the angle shown in the front elevation relative to the vertical (FIGURE 6) is set by using the proper number of gage blocks 74 to move the dovetail slide 29 along the dovetail 28. After this is done the dovetail slide is locked in position by means of the screws 32. The angle relative to the vertical shown in the end elevational view (FIGURE 7) is set by utilizing the proper number of gage blocks 75 to move the second slide 36 outwardly as shown in FIGURE 1. After these two angles have been set directly from the elevational views the indicating rod 62 is located at the proper compound angle. As an example the angle shown in FIGURE 6 is approximately 30 degrees and as a result the gage blocks 74 would have to total 1.2547 inches for a 30 degree angle. The angle shown in FIGURE 7 is approximately a 35 degree angle and for a 35 degree angle the gage blocks 75 would have to total 1.5004 inches. For a compound angle hole extending into the second quadrant 81, the front side 56 of the gage corresponds to the front edge 85 of the workpiece. The gage is next placed on the workpiece as shown in FIGURE 8 with the front edge 56 kept parallel with the front edge of the workpiece 85. Since the distances A and B to the center of radius of the hemisphere are known, the center of radius 54 can be positioned over the center 86 of the hole on the top surface of the workpiece. After this has been done, the gage is suitably secured to the workpiece by a satisfactory method which may include an adhesive, C-clamps or small permanent magnets placed on a plurality of sides of the gage. In the instant embodiment, as will be described hereinafter, the gage and workpiece are moved until they are made concentric with the spindle of a machine, however, it will also be appreciated that in some machines, the spindle would be moved rather than the gage and workpiece. In FIGURE 8, the workpiece is held by a vise 87 which might be a compound angle vise. The indicating rod is first made parallel with the tool 88 or spindle of the machine by two spaced gage blocks as shown in FIGURE 8 at at least two places around the indicating rod which are at least spaced 90 degrees from each other. This makes the indicating rod parallel with the tool or spindle of the machine. The tool or spindle of the machine as shown in FIGURES 9 and 10 is made concentric with the indicating rod by using a dial indicator or similar device. After this has been accomplished, the axis of the tool is located directly in line with the axis of the hole which is to be produced in the workpiece. The gage is removed and when the spindle of the machine is brought down with the tool 88 therein, the hole is provided in the workpiece.

If possible, the workpiece should always be oriented relative to the front of the gage so that the compound angle will extend into the second quadrant as explained with relation to the drawing shown in FIGURE 5. If this is not possible, the gage must be oriented as follows: If the hole in the drawing extends into quadrant No. 3, the left side of the gage must be made to correspond to the front of the workpiece. In this situation, the angle shown in the end elevation is set by the gage blocks 74 and the angle shown in the front elevation is set by the gage blocks 75. The center of radius 54 is located over the hole in the same manner and the same steps are gone through in producing the hole.

In the event the hole extends into quadrant No. 1 indicated by reference numeral 80, the right side 58 of the gage is made to correspond with the front edge 85 of the workpiece. In this situation the angle shown in the end elevation is set by gage blocks 74 and the angle shown in the front elevation is set by the gage blocks 75. The same steps are gone through in producing the hole.

In the event the hole extends into quadrant No. 4, the gage is completely reversed; namely, so that the rear side 59 corresponds to the front side 85 of the workpiece. The angle shown in the front elevation is set by gage blocks 74 and the angle shown in the end elevation is set by gage blocks 75. In this instance, the same steps gone through above are gone through in locating the spindle relative to the indicating rod and in producing the hole.

It will be readily appreciated that the gage can also be used to produce holes in a workpiece at an angle but in the more simple instances, when the holes are not at a compound angle. It will be appreciated that the device not only locates the workpiece and spindle of the machine at the proper compound angle relative to each other, but also locates the axis of the spindle over the axis of the hole which is to be put in the workpiece.

The gage may also be used for setting up a workpiece so that a compound angle surface may be machined thereon. FIGURE 11 is an isometric view of a workpiece with a compound angle surface 89 produced thereon. It will be noted that the surface is at an angle indicated by the reference numeral 91 relative to the horizontal and as would be shown in the front elevational view and in the side elevational view the surface is at an angle 92. By setting these two angles on the gage; namely, angle 91 by use of the gage blocks 74, and angle 92 by use of the gage blocks 75, the indicating rod 62 would be at a position which is normal or at right angles to the surface 89. The indicating rod 62 of the gage is as before in the case of producing compound angle holes made parallel with the spindle of the machine or the tool held therein and as a result any cutting action by the tool will take off the corner of the workpiece shown in FIGURE 11 at the proper compound angle. It is not necessary in this instance to make the spindle of the machine or the tool held therein concentric with the indicating rod. In producing the compound angle surface shown in FIGURE 11, the front of the gage 56 must be made to correspond to the front 94 by the workpiece. In producing compound angle surfaces, the gage may either be placed on the workpiece as discussed hereinabove in producing compound angle holes or it may be used just with the work holding device to position it at the proper angle and then the gage is removed and replaced by the workpiece. If it is at all possible it is always best to orient the workpiece so that it corresponds to that shown in FIGURE 11, however, if this is not possible, the gage must be oriented as described hereinabove in producing compound angle holes.

It will also be appreciated by those skilled in the art upon viewing the teachings and disclosures made herein, that the principles taught herein might very well be applied to a fixture or work holding device rather than as a gage. In accomplishing these results, the fixture or work holding device would best be mounted on the second end portion of the indicating rod 62 whereby any movement of the indicating rod to a desired compound angle would also move the work holding device or fixture to a desired position. As a result, in properly claiming the invention, the end surface 97 of the indicating rod which is normal to the axis of the rod may be referred to as a surface or surface means which when used in conjunction with the indicating rod and the remaining mechanism may be moved to a desired compound angle.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device for determining and locating a compound angle hole including in combination a base having a lower surface lying substantially in a plane, a member having at least a portion of a spherical surface mounted by said base with the center of radius of said portion of a spherical surface located in the plane of said lower surface, an angle indicating rod having first and second end portions, said first end portion of said rod engaging and adapted to travel on said portion of a spherical surface, and means for moving said second end portion of said rod through first and second mutually perpendicular directions which directions are parallel to said lower surface.

2. A device for determining a compound angle including in combination a base comprising a horizontal member, a vertical member extending from said horizontal member, pivot means including at least a portion of a spherical surface mounted on said horizontal member, an indicating rod having first and second end portions, said first end portion engaging said spherical surface and being movable thereon, a first slide on said vertical member and movable in a first direction generally parallel to said horizontal member, a second slide carried by said first slide and movable in a second direction generally parallel to said horizontal member and perpendicular to said first direction, and means connecting said second end portion of said indicating rod to said second slide.

3. A device for determining a compound angle including in combination a base comprising a horizontal member, a vertical member extending from said horizontal member, pivot means including at least a portion of a spherical surface mounted on said horizontal member, an indicating rod having first and second end portions, said first end portion engaging said spherical surface and being movable thereon, a first slide on said vertical member and movable in a first direction generally parallel to said horizontal member, a second slide carried by said first slide and movable in a second direction generally parallel to said horizontal member and perpendicular to said first direction, means connecting said second end portion of said indicating rod to said second slide, and gage means for moving said first and second slides predetermined distances.

4. A device for determining and locating a compound angle including in combination a base comprising a horizontal member having upper and lower surfaces, a member extending vertically from the rear of said horizontal member, a hemisphere mounted on said base with the center of radius of said hemisphere coinciding with the lower surface of said horizontal member, said center of radius of said hemisphere being located a predetermined distance from the front and the side of said horizontal member, an indicating rod having first and second end portions, said first end portion of said indicating rod engaging said hemisphere and being movable thereon, the upper surface of said vertical member being in the form of a dovetail, a dovetail slide mounted on said dovetail and being movable in a first direction generally parallel to said lower surface of said horizontal member, a first abutment member mounted by said vertical member thereby enabling gage blocks to be positioned between said first abutment member and said dovetail slide, a rod slide carried by said dovetail slide and movable relative thereto in a second direction generally parallel to said lower surface of said horizontal member and normal to said first direction, a second abutment member connected to and carried by said dovetail slide thereby enabling gage blocks to be positioned between said second abutment and said rod slide, means connecting said second end portion of said indicating rod to said second slide, and means for locking said dovetail slide and said rod slide in fixed positions.

5. A compound angle device including a base, a member mounted by said base and having at least a portion of a spherical surface, an indicating rod having first and second end portions, said first end portion of said rod engaging and adapted to travel on said portion of a spherical surface, and means for moving said second end portion of said rod through first and second directions which are generally perpendicular to each other.

6. A device for determining a compound angle including in combination a base comprising a horizontal portion and a vertical portion, pivot means mounted on said horizontal portion, an indicating rod having first and second end portions, said first end portion being mounted by said pivot means, a first slide on said vertical portion and movable in a first direction generally parallel to said horizontal portion, a second slide carried by said first slide and movable in a second direction generally parallel to said horizontal portion and transverse to said first direction, means connecting said second end portion of said indicating rod to said second slide, and gage means for moving said first and second slides predetermined distances.

7. A device for determining a compound angle including in combination a base comprising a horizontal portion and a vertical portion, pivot means mounted on said horizontal portion, an indicating rod having first and second end portions, said first end portion being mounted by said pivot means, a first slide on said vertical portion and movable in a first direction generally parallel to said horizontal portion, a second slide carried by said first slide and movable in a second direction generally parallel to said horizontal portion and transverse to said first direction, means connecting said second end portion of said indicating rod to said second slide.

References Cited in the file of this patent

UNITED STATES PATENTS 2,812,586    Matthews _____ Nov. 12, 1957